L. A. PETERSON.
MEANS FOR FIXING A WHEEL OR THE LIKE ON ITS SHAFT.
APPLICATION FILED NOV. 21, 1914.
1,180,793.
Patented Apr. 25, 1916.
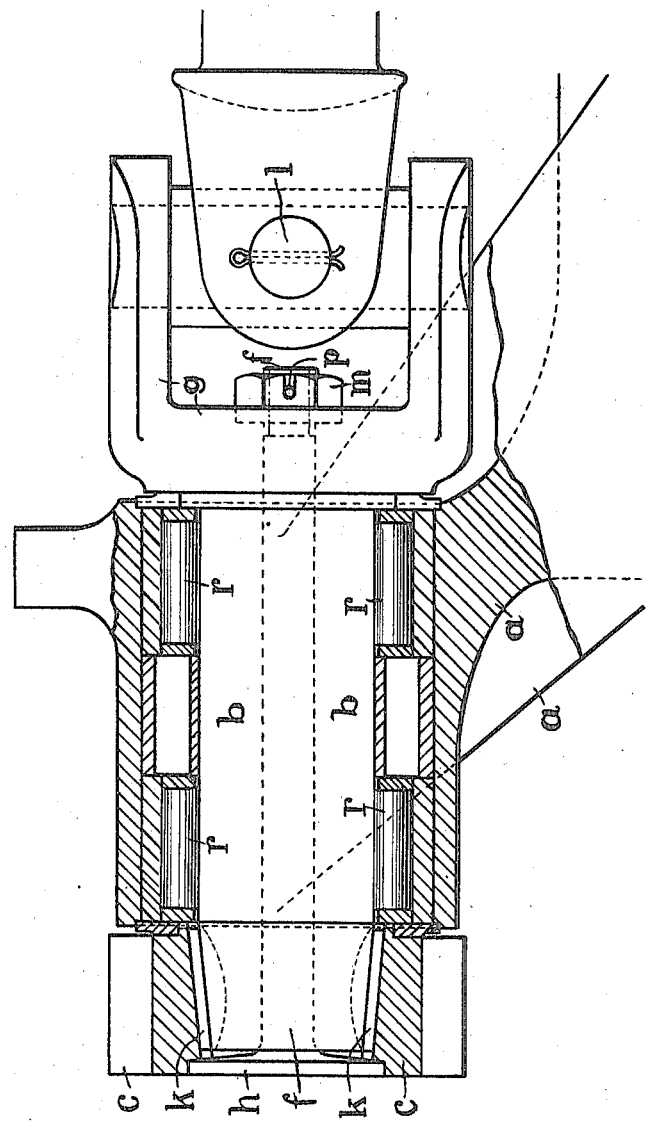

UNITED STATES PATENT OFFICE.

LARS AUGUST PETERSON, OF STOCKHOLM, SWEDEN, ASSIGNOR TO AKTIEBOLAGET CENTRALI CENTRALPALATSET, OF STOCKHOLM, SWEDEN.

MEANS FOR FIXING A WHEEL OR THE LIKE ON ITS SHAFT.

1,180,793.     Specification of Letters Patent.     Patented Apr. 25, 1916.

Application filed November 21, 1914. Serial No. 873,308.

*To all whom it may concern:*

Be it known that I, LARS AUGUST PETERSON, a citizen of the Kingdom of Sweden, residing at Vikingagatan 9, in the city of Stockholm, Sweden, have invented a new Means for Fixing a Wheel or the like on Its Shaft, of which the following is a specification.

My invention relates to means for fixing a wheel or the like on its shaft and is preferably intended to be used in automobiles and the like where a pinion or the like fixed on a swingable and telescoping shaft is intended to engage any one of a series of conaxial gears or the like. In hitherto known constructions of such change speed gearings said pinion is either integral with its shaft or fixed thereon by means of a nut screwed on the projecting end of the shaft. In both instances it is difficult or tedious to change (take off and put on) the pinion, as this can only be done by screwing apart a great deal of the mechanism. If the teeth of the conaxial gears are directed inwardly it is also difficult to ascertain whether the means intended to prevent unscrewing of the nut is in proper order, as this means is then hidden in the hollow conus formed by said gears. In order to avoid all these difficulties, I fix the pinion by means of a bolt passed through a central bore-hole in the shaft and tightened by a nut screwed on the top of the bolt which projects at the other and of the shaft, the head of the bolt being sunk into the pinion so as to not project outside of the rear end of the latter.

On the annexed drawing, which shows an example, $a$ is a swingable and reciprocable support in which the shaft $b$ is rotatable in roller bearings $r$. The front end of this shaft has the shape of a fork $g$, which is a member of a universal joint $l$. The rear conical end of the shaft has segmental slots and the wheel has straight slots, for suitable keys, and the shaft has a central longitudinal bore for the bolt $f$, which locks the pinion $c$ on the shaft. The rear end of the pinion has an excavation for the head of the bolt. The nut $m$ can be locked by a split pin $p$ or the like.

In assembling the parts the shaft $b$ is passed from before into its bearings and the bolt $f$ with the pinion passed thereon is passed from behind into the shaft. When the shaft is fully inserted, the segmental keys $k$ are placed in their slots and the pinion is passed on the shaft and the bolt is fully shoved in and locked by screwing on and tightening the nut $m$, which in its turn is locked by the split pin $p$. Lastly the universal joint is assembled. The taking apart is effected in the same way but in the reverse order.

This construction has the following advantages: 1. The universal joint is easier to manufacture correctly as the portion thereof intended to be rigidly connected to the shaft $b$ is integral with it. 2. The pinion $c$ can be changed in a few minutes. 3. When the lid of the casing of the change speed gearing is removed you can at once control the locking means for the pinion, as the nut $m$ is then fully uncovered.

What I claim is:

1. In combination with a wheel and its forked shaft having a longitudinal bore, means for securing the wheel at the end of said shaft comprising a bolt passed through the longitudinal bore of said shaft and a nut between the prongs of the shaft fork for locking said bolt, the head of said bolt engaging the wheel and the nut engaging the end of said shaft, substantially as described and for the purpose set forth.

2. A means for securing a wheel on its shaft comprising in combination a shaft forked at its front end and having a longitudinal bore, a support for said shaft, a pinion at the rear end of said shaft, a bolt in the longitudinal bore of the shaft for locking with its head said pinion on said shaft, a nut on said bolt between the fork of said shaft for locking said bolt, and means for locking said nut, substantially as described and for the purpose set forth.

In testimony whereof I have signed my name to this specification in the presence of two subscribing witnesses.

LARS AUGUST PETERSON.

Witnesses:
L. ROWELL,
N. A. SPARR.

Copies of this patent may be obtained for five cents each, by addressing the "Commissioner of Patents, Washington, D. C."